United States Patent
Lin

(10) Patent No.: US 9,472,085 B2
(45) Date of Patent: Oct. 18, 2016

(54) AMBIENT AND PROCESSOR TEMPERATURE DIFFERENCE COMPARISON

(75) Inventor: Hsin-Tso Lin, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 9 days.

(21) Appl. No.: 14/383,985

(22) PCT Filed: May 31, 2012

(86) PCT No.: PCT/US2012/040244
§ 371 (c)(1),
(2), (4) Date: Sep. 9, 2014

(87) PCT Pub. No.: WO2013/180720
PCT Pub. Date: Dec. 5, 2013

(65) Prior Publication Data
US 2015/0029032 A1    Jan. 29, 2015

(51) Int. Cl.
| | | |
|---|---|---|
| G08B 17/00 | (2006.01) |
| B60Q 1/00 | (2006.01) |
| G08B 21/18 | (2006.01) |
| G06F 1/20 | (2006.01) |

(52) U.S. Cl.
CPC ............ *G08B 21/182* (2013.01); *G06F 1/206* (2013.01)

(58) Field of Classification Search
CPC ...... G08B 21/182; G06G 1/206; G01K 7/42; G06F 1/206
USPC .................. 340/584, 506, 539.26, 589, 588, 340/636.18, 449, 870.17; 702/130, 132, 702/136; 374/163, 142; 361/679.54, 687
See application file for complete search history.

(56) References Cited

U.S. PATENT DOCUMENTS

| | | | | |
|---|---|---|---|---|
| 4,096,575 A * | 6/1978 | Itoh | ...................... | G01D 3/0365 250/252.1 |
| 6,092,926 A * | 7/2000 | Still | ........................ | G01K 7/42 340/584 |
| 7,275,012 B2 * | 9/2007 | Hermerding, II | ........ | G01K 7/42 340/584 |
| 7,656,635 B2 * | 2/2010 | Rotem | .................... | G06F 1/206 361/103 |
| 8,786,449 B1 * | 7/2014 | Kraipak | .................. | G06F 1/206 340/506 |
| 2004/0002825 A1 | 1/2004 | Raichle et al. | | |
| 2004/0128101 A1 * | 7/2004 | Hermerding, II | ........ | G01K 7/42 702/136 |
| 2004/0174674 A1 * | 9/2004 | Stewart | ..................... | G06F 1/20 361/679.48 |

(Continued)

FOREIGN PATENT DOCUMENTS

| | | |
|---|---|---|
| CN | 101546215 | 9/2009 |
| EP | 1313000 A2 | 5/2003 |
| EP | 2077145 A1 | 7/2009 |

OTHER PUBLICATIONS

International Search Report and Written Opinion, International Application No. PCT/US2012/040244, Date Mailed: Jan. 31, 2013, pp. 1-8.

(Continued)

*Primary Examiner* — Hoi Lau
(74) *Attorney, Agent, or Firm* — HP Inc Patent Department

(57) ABSTRACT

Embodiments herein relate to ambient and processor temperature difference comparison. Processor and ambient temperatures are measured. A difference between the processor and ambient temperatures is compared to an initial difference. A warning may be signaled if a difference between the determined difference and the initial difference is greater than a threshold value.

15 Claims, 4 Drawing Sheets

(56) References Cited

U.S. PATENT DOCUMENTS

| | | | |
|---|---|---|---|
| 2005/0030171 A1* | 2/2005 | Liu | G06F 1/206 340/500 |
| 2006/0034343 A1* | 2/2006 | Rotem | G06F 1/206 374/45 |
| 2006/0095911 A1* | 5/2006 | Uemura | G06F 1/206 718/100 |
| 2009/0009960 A1 | 1/2009 | Melanson et al. | |
| 2009/0045967 A1 | 2/2009 | Bandholz et al. | |
| 2009/0144014 A1* | 6/2009 | Aljabari | G01K 1/20 702/130 |
| 2009/0244843 A1 | 10/2009 | Hirohata et al. | |
| 2009/0323277 A1* | 12/2009 | Hosokawa | G06F 1/203 361/679.54 |
| 2010/0102949 A1* | 4/2010 | Rotem | G06F 1/206 340/506 |
| 2011/0066401 A1 | 3/2011 | Yang et al. | |
| 2011/0119018 A1* | 5/2011 | Skarp | G01K 7/42 702/130 |
| 2011/0176275 A1* | 7/2011 | Sato | G06F 1/206 361/695 |
| 2014/0369110 A1* | 12/2014 | Cho | G11C 7/04 365/149 |
| 2015/0029032 A1* | 1/2015 | Lin | G08B 21/182 340/584 |
| 2015/0046729 A1* | 2/2015 | Fukuoka | G06F 13/24 713/320 |

OTHER PUBLICATIONS

Extended EP Search Report for EP Application No. 12877652.3-195912856276 dated Dec. 17, 2015, 9 pp.

* cited by examiner

AMBIENT AND PROCESSOR TEMPERATURE DIFFERENCE COMPARISON

BACKGROUND

As a device runs, it may begin to attract particles, such as dust. Over time, these particles may gather within the device and affect a thermal performance of the device. For example, an ability of the device to dissipate heat may decrease as an amount of the particles gathered within the device increases.

BRIEF DESCRIPTION OF THE DRAWINGS

The following detailed description references the drawings, wherein.

DETAILED DESCRIPTION

As a device, such as a computer, runs, it may begin to attract particles, such as dust, into the device. Eventually, as more dust accumulates within the device, an ability of the device to dissipate heat may become affected. For example, as dust accumulates within a housing of a computer, the ability of the device to expel air heated by a processor of the device through vents of the device may become obstructed. Similarly, an ability of the processor itself to dissipate the heat from itself to the air may be hindered by the accumulated dust. Thus, this may lead to a decrease in an overall performance of the device as well as a life of the device. For example, the processor of the device may perform operations at a slower rate and/or malfunction sooner if its ability to dissipate heat decreases.

Embodiments may provide a method and/or device for determining when a performance and/or life of the device may be affected by the accumulation of particles. At this time, the device may be cleaned to immediately improve performance of the device and prolong the life of the device. In addition, return merchandise authorization (RMA) costs may be reduced by decreasing a likelihood of the device failing within a warranty period. For example, an embodiment may measure a current processor temperature, measure a current ambient temperature, and determine a difference between the current processor temperature and the current ambient temperature. Then, the determined difference may be compared to an initial difference and a warning may be signaled if a difference between the determined difference and the initial difference is greater than a threshold value.

Figure 1:
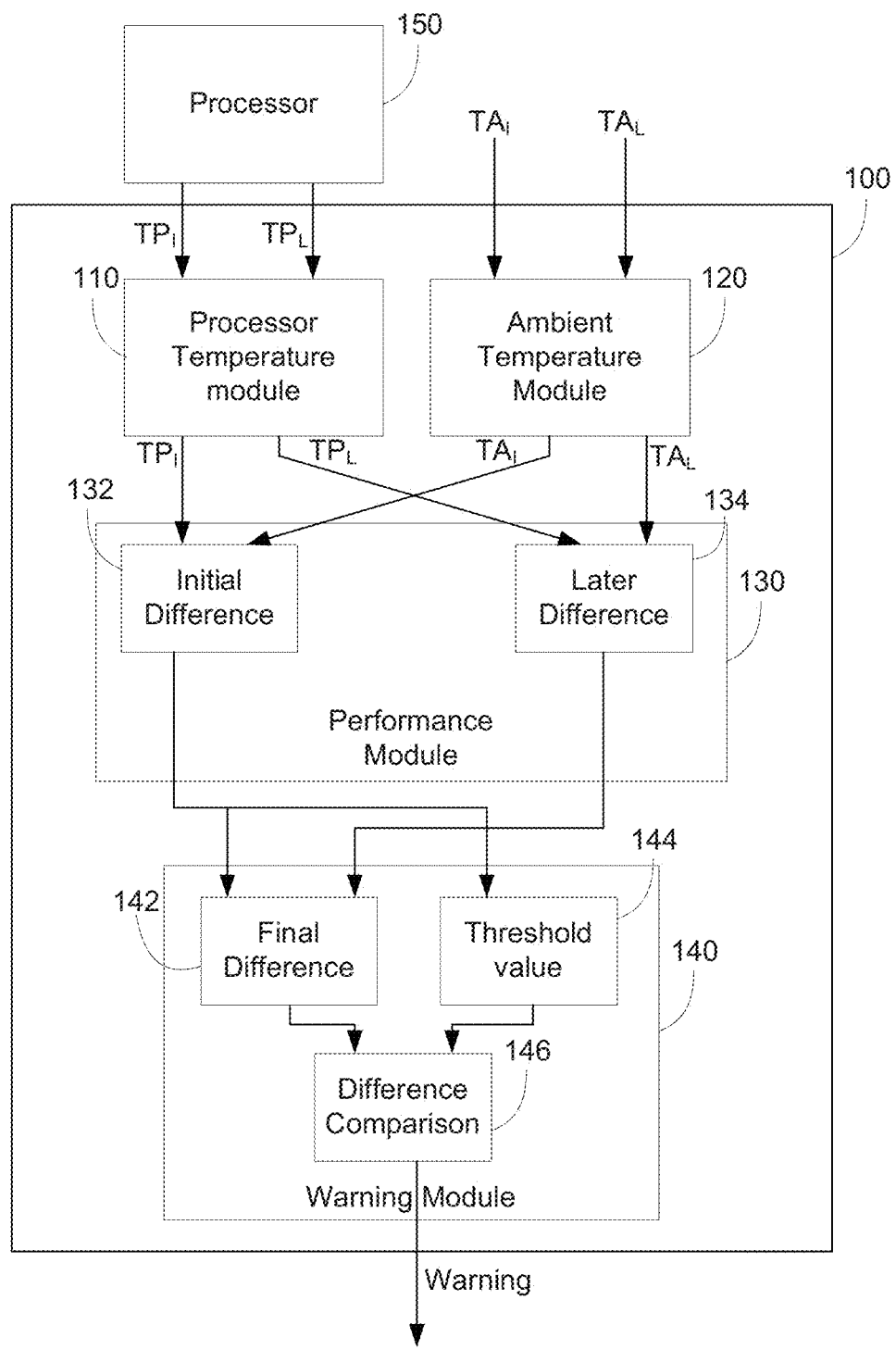
FIG. 1 is an example block diagram of a system for ambient and processor temperature difference comparison.

Referring now to the drawings, FIG. 1 is an example block diagram of a system 100 for ambient and processor temperature difference comparison. The system 100 may be included in any type of device housing a processor, such as a notebook computer, a desktop computer, an all-in-one system, a slate computing device, a portable reading device, a wireless email device, a mobile phone, and the like.

In the embodiment of FIG. 1, the system 100 includes a processor temperature module 110, an ambient temperature module 120, a performance module 130 and a warning module 140. Further, the system 100 is shown to interface with a processor 150 of a device (not shown). The processor temperature, ambient temperature, performance, and warning modules 110, 120, 130 and 140 may include, for example, a hardware device including electronic circuitry for implementing the functionality described below, such as control logic and/or memory. In addition or as an alternative, the processor temperature, ambient temperature, performance, and warning modules 110, 120, 130 and 140 may be implemented as a series of instructions encoded on a machine-readable storage medium and executable by a processor.

The processor temperature module 110 is to measure a temperature of the processor 150 (processor temperature) of the device at an initial time period $TP_I$ and a later time period $TP_L$ after the initial time period. The initial time period may be during a time when an interior of the device is substantially free of dust, such as a first time the device is powered on after being assembled, distributed and/or sold. For instance, the initial time period may refer to a first time a manufacturer, vendor and/or user powers on the device. In one embodiment, the initial time period may also refer to a time period after the interior of the device has been cleaned to remove the dust. The later time period may refer to any time period after the initial period, such as an n-th time the device is being powered on or used, where n is a natural number greater than or equal to 2.

The later time period may period may also be measured independently from a number of uses or power-ons of the device, such as a definite time period after the initial time period, like every two weeks. In one embodiment, the later time period may be set to occur periodically according to a schedule. The schedule may be set, for example, by the user, a distributor, a manufacturer of the device, etc.

The ambient temperature module 120 is to measure a temperature of air inside or around the device (ambient temperature) during the initial time $TA_I$ and at the later time period $TA_L$. The processor temperature and ambient temperature modules 110 and 120 may either include or connect to an external temperature sensor, such as a thermometer, in order to measure the temperatures of the processor 150 and the air. In one example, the processor 150 of the device may include a first temperature sensor (not shown) that senses and outputs a temperature of the processor 150 to the system 100 and the device may include a second temperature sensor (not shown) that senses and outputs an ambient temperature of the device to the system 100. Examples of the first and second temperature sensors may include a thermometer.

The system 100 may throttle the processor 150 to full capacity or utilization during the initial and/or later time periods while the processor temperature module 110 measures the processor temperature. The processor and/or ambient temperatures may continue to increase before stabilizing due the processor 150 radiating heat while being throttled to full capacity. Eventually, the processor and/or ambient temperatures may cease to substantially change, such as due a ventilation design of the device and/or a composition of the processor 150. Thus, the processor temperature module 110 may measure the processor temperature during the initial and later time periods $TP_I$ and $TP_L$ after the processor temperature substantially stabilizes while the processor 150 is being throttled. The ambient temperature module 120 may measure the ambient temperature before the processor 150 is throttled and/or while the processor 150 is throttled, based on a design of the device and/or a preference of the user, vendor and/or manufacturer.

For instance, the system 100 may throttle the processor 150 during the initial time period for approximately 20 minutes before the processor temperature $TP_I$ remains steady around 60° Celsius (C) and/or the ambient temperature $TA_I$ remains steady around 35° C. Then, the system 100 may throttle the processor 150 during the later time period for approximately 20 minutes before the processor temperature $TP_L$ steadies around 66° Celsius (C) and/or the ambient temperature $TA_L$ remain steadies around 34° C. The processor and ambient temperature modules 110 and 120 may measure and output the above temperatures $TP_I$, $TP_L$, $TA_I$ and $TA_L$ to the performance module 130.

The performance module 130 is to determine an initial difference 132 between the processor and ambient temperatures during the initial time period $TP_I$ and $TA_I$ and to determine a later difference 134 between the processor and ambient temperatures during the later time period $TP_L$ and $TA_L$. For example, if the processor and ambient temperatures during the initial time period $TP_I$ and $TA_I$ are respectively 60° C. and 35° C., the initial difference 132 may be 25. If the processor and ambient temperature during the later time period $TP_L$ and $TA_L$ are respectively 66° C. and 34° C., the later difference 134 may be 32.

The warning module 140 is to generate a warning if a final difference 142 between the initial and later differences 132 and 134 is greater than a threshold value 144. The final difference 142 being greater than the threshold value 144 may indicate that enough dust has accumulated within the device to affect performance and/or a lifespan of the device. Thus, the warning may generate, for example, a message to a user to remove dust from an interior of the device. The threshold value may be a percentage of the initial difference, such as 20%. Alternatively, the threshold value may be a derived other ways, such as a based on a table that correlates a value of the initial difference to a threshold value. The percentage or value for the threshold value may be set by a user, a distributor, a manufacturer of the device, etc.

For example, the final difference 142 may be 7 if the initial and later differences 132 and 134 are respectively 25 and 32. Further, the threshold value may be 5 if it is set to be 20% of the initial difference. The warning module 140 may compare 146, such as via a comparator, the threshold value 144 and the final difference 142. In this example, the final difference 142, which is 7, is greater than the threshold value, which is 5. Thus, the warning module 144 may generate the warning in this case. If the final difference 142 had been less than 5, the warning module 144 would not have generated the warning in this case.

In one embodiment, the system 100 may automatically carry out the above operations again for the later time period the next time the device is powered on and after the warning was generated, in order to determine if an interior of the device was cleaned. The system 100 may interface with an operating system (OS) and/or Basic Input Output System (BIOS) to collect the temperature of the processor 150, the temperature inside the device 120 and/or generate the warning. For instance, the system 100 may communicate with the BIOS to receive the above temperatures and/or generate an interrupt for the warning.

Figure 2:
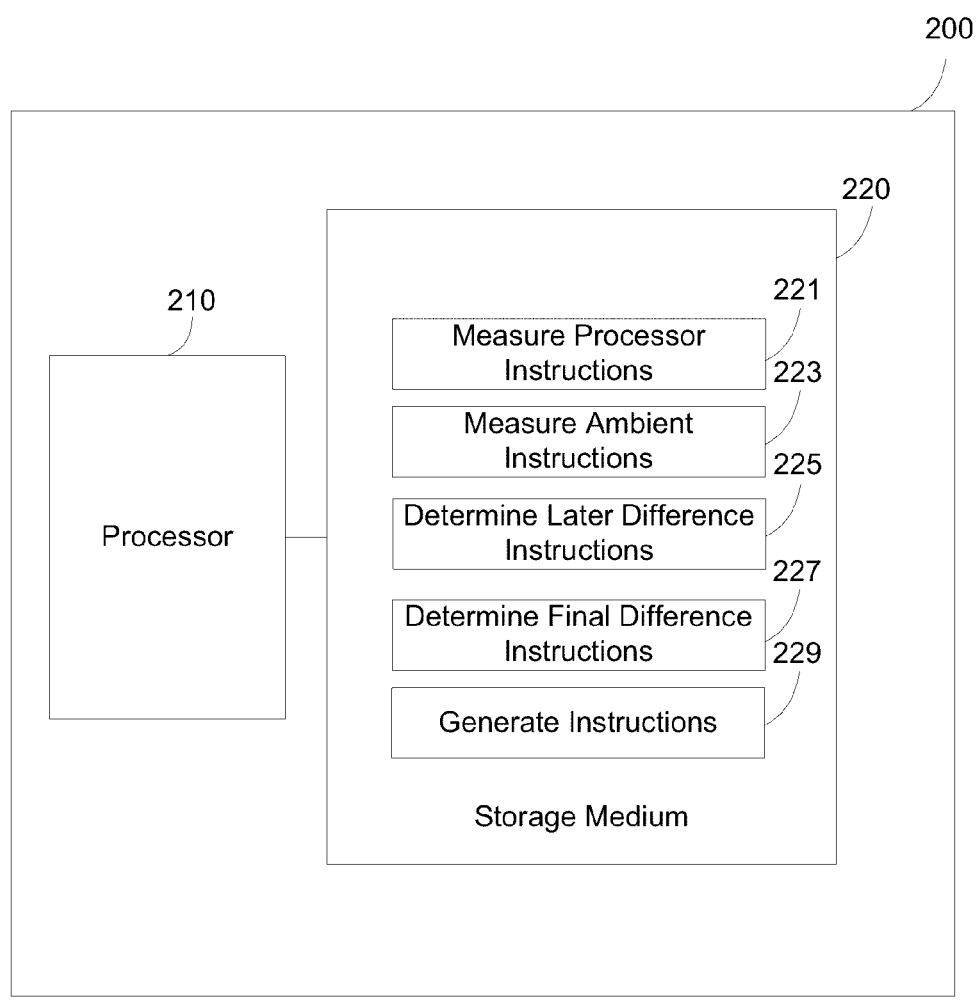
FIG. 2 is an example block diagram of a computing device including instructions for ambient and processor temperature difference comparison.

FIG. 2 is an example block diagram of a computing device 200 including instructions for ambient and processor temperature difference comparison. In the embodiment of FIG. 2, the computing device 200 includes a processor 210 and a machine-readable storage medium 220. The machine-readable storage medium 220 further includes instructions 221, 223, 225, 227 and 229 for ambient and processor temperature difference comparison. The computing device 200 may be, for example, a server, a notebook computer, a desktop computer, a slate computing device, a mobile device or any other type of user device capable of executing the instructions 221, 223, 225, 227 and 229. In certain examples, the computing device 200 may include or be connected to additional components such as memories, sensors, displays, etc.

The processor 210 may be, at least one central processing unit (CPU), at least one semiconductor-based microprocessor, at least one graphics processing unit (GPU), other hardware devices suitable for retrieval and execution of instructions stored in the machine-readable storage medium 220, or combinations thereof. The processor 210 may fetch, decode, and execute instructions 221, 223, 225, 227 and 229. As an alternative or in addition to retrieving and executing instructions, the processor 210 may include at least one integrated circuit (IC), other control logic, other electronic circuits, or combinations thereof that include a number of electronic components for performing the functionality of instructions 221, 223, 225, 227 and 229.

The machine-readable storage medium 220 may be any electronic, magnetic, optical, or other physical storage device that contains or stores executable instructions. Thus, the machine-readable storage medium 220 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 420 can be non-transitory. As described in detail below, machine-readable storage medium 420 may be encoded with a series of executable instructions for ambient and processor temperature difference comparison.

Figure 3:
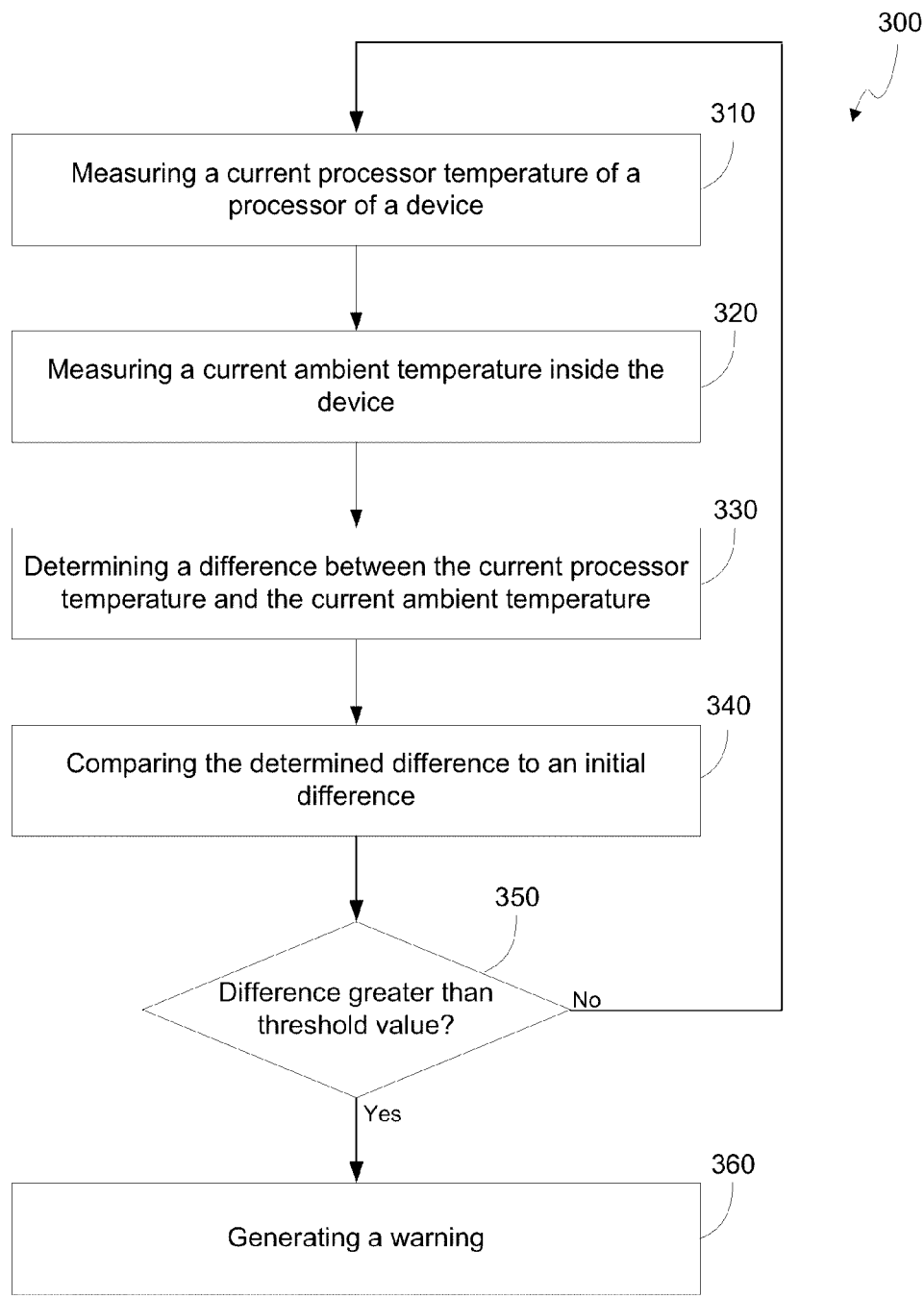
FIG. 3 is an example flowchart of a method for ambient and processor temperature difference comparison.
Figure 4:
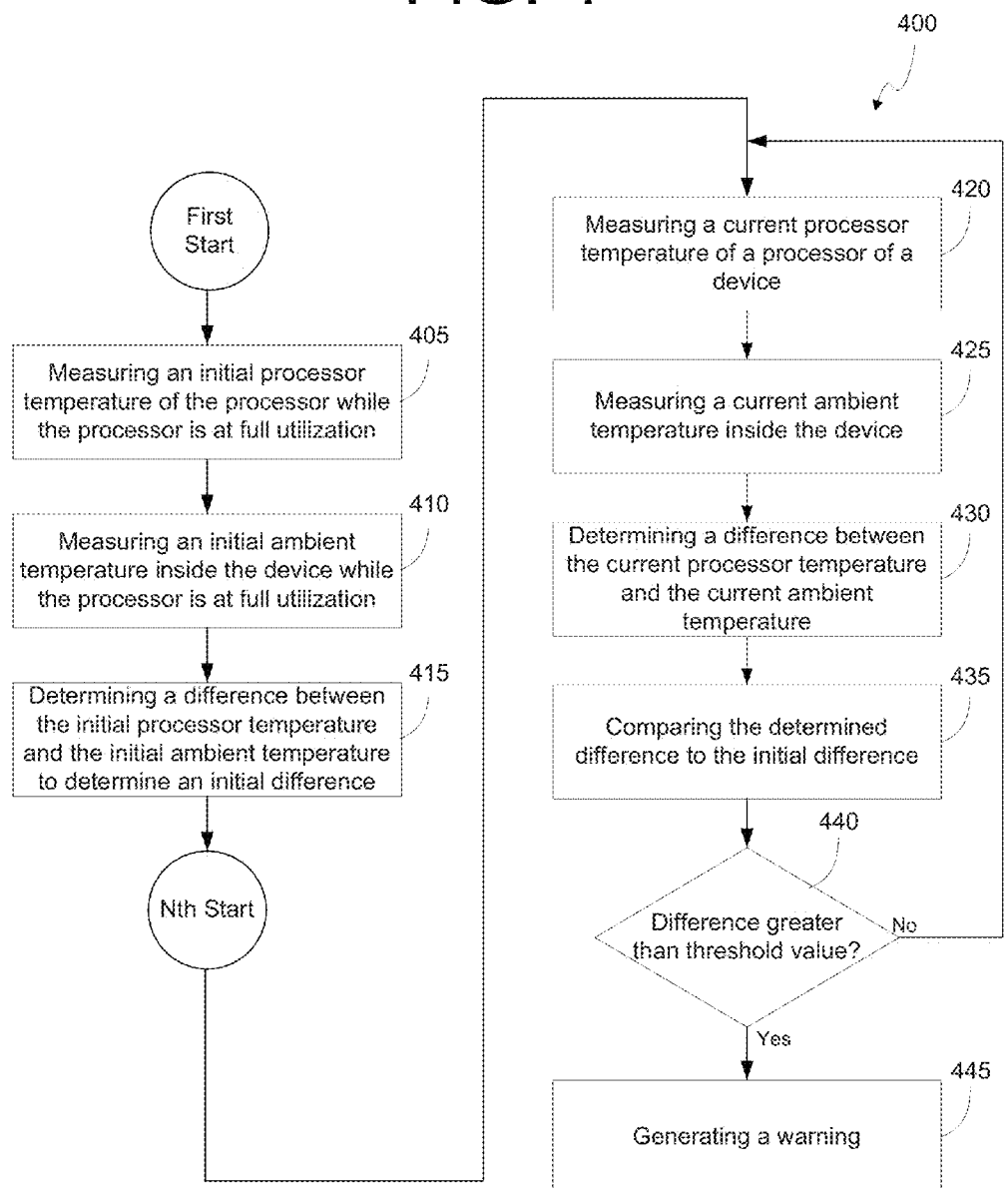
FIG. 4 is another example flowchart of a method for ambient and processor temperature difference comparison.

Moreover, the instructions 221, 223, 225, 227 and 229 when executed by a processor (e.g., via one processing element or multiple processing elements of the processor) can cause the processor to perform processes, such as, the processes of FIGS. 3 and 4. For example, the measure processor instructions 221 may be executed by the processor 210 to measure a temperature of a processor (not shown) of a device. The measure ambient instructions 223 may be executed by the processor 210 to measure a temperature of ambient air inside or around the device. The determine later difference instructions 225 may be executed by the processor 210 to determine a later difference between the temperature of the processor and the temperature of the ambient air.

The determine final difference instructions 227 may be executed by the processor 210 to determine a final difference between the later difference and an initial difference. As explained above, the initial difference may be based on the temperatures of the processor and ambient air at an earlier time period than that of the measure instructions 221 and 223, such as a first time the device was used or powered on and/or in new condition. Further, the measuring of the processor temperature may be carried out while the processor is being fully utilized. For example, a benchmark may be carried out to fully utilize the processor. The generate instructions 229 may be executed by the processor 210 to generate a warning if the final difference is greater than a threshold value, as explained above.

FIG. 3 is an example flowchart of a method 300 for ambient and processor temperature difference comparison. Although execution of the method 300 is described below with reference to the system 100, other suitable components for execution of the method 300 can be utilized. Additionally, the components for executing the method 300 may be spread among multiple system and/or devices (e.g., a processing device in communication with input and output devices). In certain scenarios, multiple devices acting in coordination can be considered a single device to perform the method 300. The method 300 may be implemented in the form of executable instructions stored on a machine-readable storage medium, such as storage medium 220, and/or in the form of electronic circuitry.

At block 310, the system 100 measures a current processor temperature $TP_L$ of a processor 150 of a device. Then, at block 320, the system 100 measures a current ambient temperature $TA_L$ inside or around the device. The operation of blocks 310 and 320 may occur in opposite order or simultaneously. Afterward, at block 330, the system 100 determines a difference 134 between the current processor temperature $TP_L$ and the current ambient temperature $TA_L$. Next, at block 340, the system 100 compares the determined difference 134 to an initial difference 132 and then flows to block 350. The determined difference 134 may be calculated periodically according to a schedule. The schedule may be set by the user, a distributor, a manufacturer of the device, etc.

If a difference 142 between the determined difference 134 of block 340 and the initial difference 132 is greater than a threshold value 144, then the system 100 flows to block 360 to signal a warning. The warning may indicate to clean an interior of the device. Otherwise, if the difference 142 between the determined difference 134 and the initial difference 132 is less than or equal to the threshold value 144, the system 100 returns to block 310. The threshold value may be a percentage of the initial difference 132, such as 20%. The percentage may be set by a user, distributor, a manufacturer of the device, etc.

FIG. 4 is another example flowchart of a method 400 for ambient and processor temperature difference comparison. Although execution of the method 400 is described below with reference to the system 100, other suitable components for execution of the method 400 can be utilized. Additionally, the components for executing the method 400 may be spread among multiple system and/or devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 220, and/or in the form of electronic circuitry.

After a first start of a device, such as a first time a user, manufacturer or vendor powers on the device, at block 410, the system 100 measures an initial processor temperature $TP_I$ of the processor 150 while the processor 150 is at full utilization. Then, at block 410, the system 100 measures an initial ambient temperature $TA_I$ inside or around the device. The operation of blocks 405 and 410 may occur in opposite order or simultaneously. Afterward, at block 415, the system 100 determines a difference between the initial processor temperature $TP_I$ and the initial ambient temperature $TA_I$ to determine the initial difference 132.

Thus, the initial difference value 132 is set the first time the device is powered on after being manufactured, distributed to a consumer, and the like. The initial difference may be stored, such as in a memory. However, the measuring of the initial processor temperature $TP_I$ at block 405, the measuring of the initial ambient temperature $TA_I$ at block 410, and the determining of a difference between the initial processor temperature $TP_I$ and the initial ambient temperature $TA_I$ at block 415, may also be repeated at another time than the first time. For example, the above operations may be carried out to update or reset the initial difference 132 even after the first time the device is used, such as when the device is powered on after being cleaned.

After any nth start of the device, where n is a natural number greater than 1, such as a subsequent powering on of the device, at block 420, the system 100 measures a current processor temperature $TP_L$ of a processor 150 of the device. As explained above, the system 100 may wait to the measure the initial and current processor temperatures $TP_I$ and $TP_L$ until they stabilize while the processor 150 is being throttled to full utilization. Then, at block 425, the system 100 measures a current ambient temperature $TA_L$ inside or around the device. The operation of blocks 420 and 425 may occur in opposite order or simultaneously. The initial and current ambient temperatures $TA_I$ and $TA_L$ may relate to a temperature of the air inside or around the device and away from the processor 150. The initial and current processor temperatures $TP_I$ and $TP_L$ may relate to a temperature at least one of inside and next to the processor 150.

Afterward, at block 430, the system 100 determines a difference 134 between the current processor temperature $TP_L$ and the current ambient temperature $TA_L$. Thus, the determined difference 134 may be calculated a next time the device is powered on. Next, at block 435, the system 100 compares the determined difference 134 to the initial difference 132 and then flows to block 440. If a difference 142 between the determined difference 134 and the initial difference 132 is greater than a threshold value 144, then the system 100 flows to block 445 to signal a warning. Otherwise, if the difference between the determined difference and the initial difference is less than or equal to the threshold value 144, the system 100 returns to block 420.

Specific details are given in the above description to provide an understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

I claim:

1. A method, comprising:
measuring a current processor temperature of a processor of a device;
measuring a current ambient temperature inside the device;
determining a difference between the current processor temperature and the current ambient temperature;
comparing the determined difference to an initial difference; and
generating a warning if a difference between the determined difference and the initial difference is greater than a threshold value.

2. The method of claim 1, further comprising:
measuring an initial processor temperature of the processor;
measuring an initial ambient temperature; and
determining a difference between the initial processor temperature and the initial ambient temperature to determine the initial difference, wherein
the processor is throttled to full utilization during the initial and current processor temperature measurements, and
the initial processor and ambient temperatures are measured before the current processor and ambient temperatures.

3. The method of claim 2, wherein the initial difference value is set a first time the device is powered on at least one of after being manufactured and distributed to a consumer.

4. The method of claim 2, wherein the initial and current processor temperatures are measured after the initial and current processor temperatures become substantially stable.

5. The method of claim 2, wherein,
the initial and current ambient temperatures correspond to a temperature of an air passage away from the processor,
the initial and current processor temperatures relate to a temperature at least one of inside and next to the processor, and
the warning is to indicate to clean the device.

6. The method of claim 2, wherein the determined difference is calculated a next time the device is powered on after the warning is generated to determine if the device is clean.

7. The method of claim 2, wherein the the initial processor temperature, the the initial ambient temperature, and the difference between the initial processor temperature and the initial ambient temperature is updated to reset the initial difference, if the device is powered on after being cleaned.

8. The method of claim 1, wherein the threshold value is a percentage of the initial difference, the percentage to be set by at least one of a user, distributor and a manufacturer of the device.

9. The method of claim 1, wherein the determined difference is calculated periodically according to a schedule, the schedule to be set by at least one of the user, distributor and a manufacturer of the device.

10. A system, comprising:
a processor temperature module to measure a temperature of a processor of a device at an initial time period and a later time period after the initial time period;
an ambient temperature module to measure a temperature of air inside the device during the initial time and at the later time period;
a performance module to determine an initial difference between the processor and ambient temperature during the initial time period and to determine a later difference between the processor and ambient temperature during the later time period; and
a warning module to generate a warning if a final difference between the initial and final differences is greater than a threshold value.

11. The system of claim 10, wherein the initial time period is during a time when an interior of the device is substantially free of dust.

12. The system of claim 11, wherein the processor is throttled to full capacity while the processor temperature module measures the temperature of the processor.

13. The system of claim 12, wherein the processor temperature module measures the temperature of the processor after the temperature of the processor substantially stabilizes.

14. A non-transitory computer-readable storage medium storing instructions that, if executed by a processor of a device, cause the processor to:
measure a temperature of the processor;
measure a temperature of ambient air at the device;
determine a later difference between the temperature of the processor and temperature of the ambient air;
determine a final difference between the later difference and an initial difference; and
generate a warning if the final difference is greater than a threshold value.

15. The non-transitory computer-readable storage medium of claim 14, wherein,
the initial difference is based on a difference between the temperature of the processor and the temperature of the ambient air when the device is in a dust-free condition,
the temperature of the processor is measured while the processor is being fully utilized, and
the later difference is determined after the initial difference.

* * * * *